Nov. 27, 1951    G. H. BURTENSHAW    2,576,569
DENTAL DEMONSTRATING APPARATUS

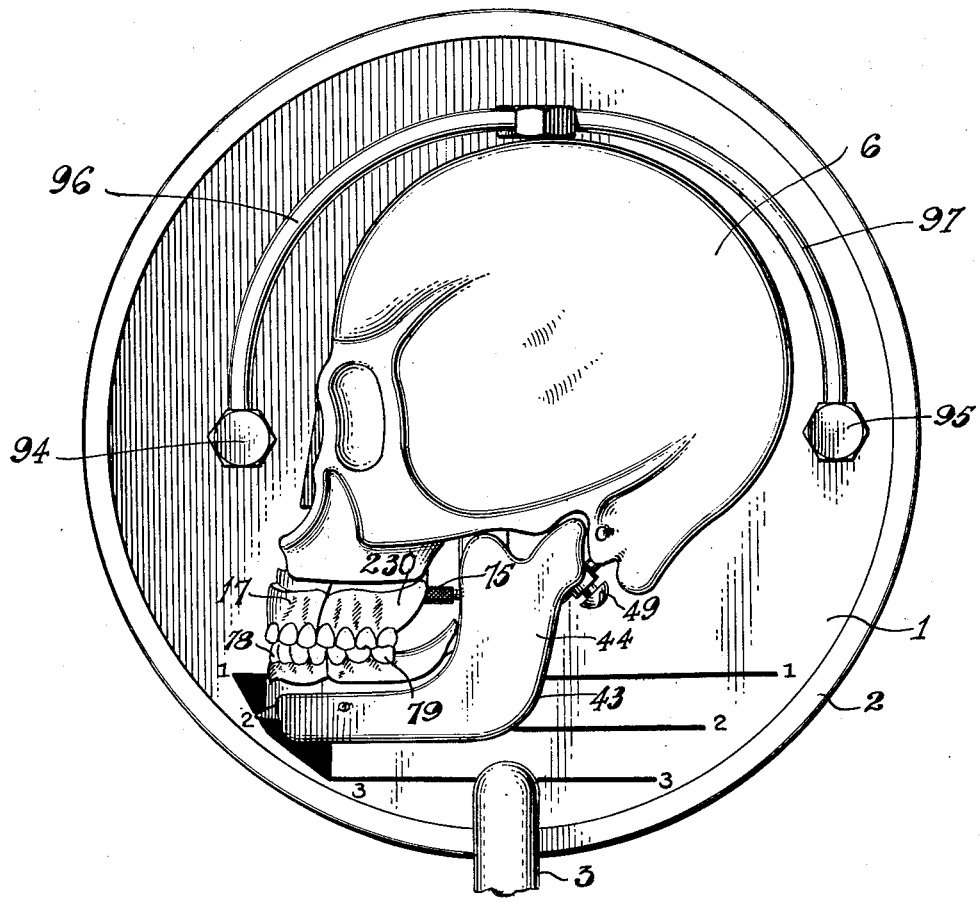
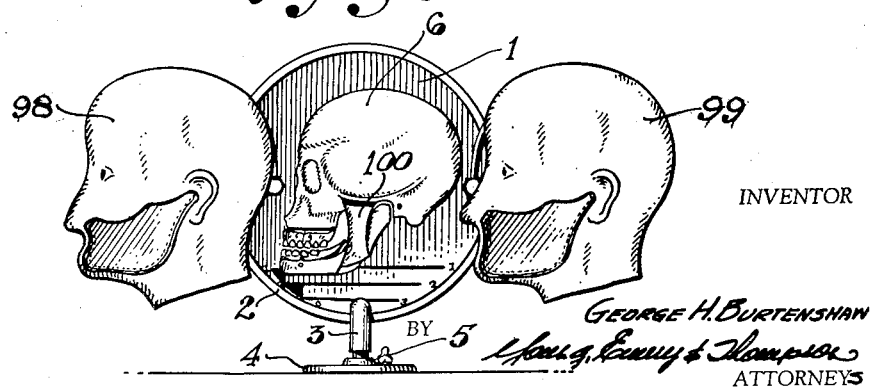

Filed Oct. 19, 1949    5 Sheets-Sheet 2

INVENTOR
GEORGE H. BURTENSHAW
BY
ATTORNEYS

Nov. 27, 1951     G. H. BURTENSHAW     2,576,569
DENTAL DEMONSTRATING APPARATUS

Filed Oct. 19, 1949     5 Sheets—Sheet 4

INVENTOR
GEORGE H. BURTENSHAW
BY *Young, Emery & Thompson*
ATTORNEYS

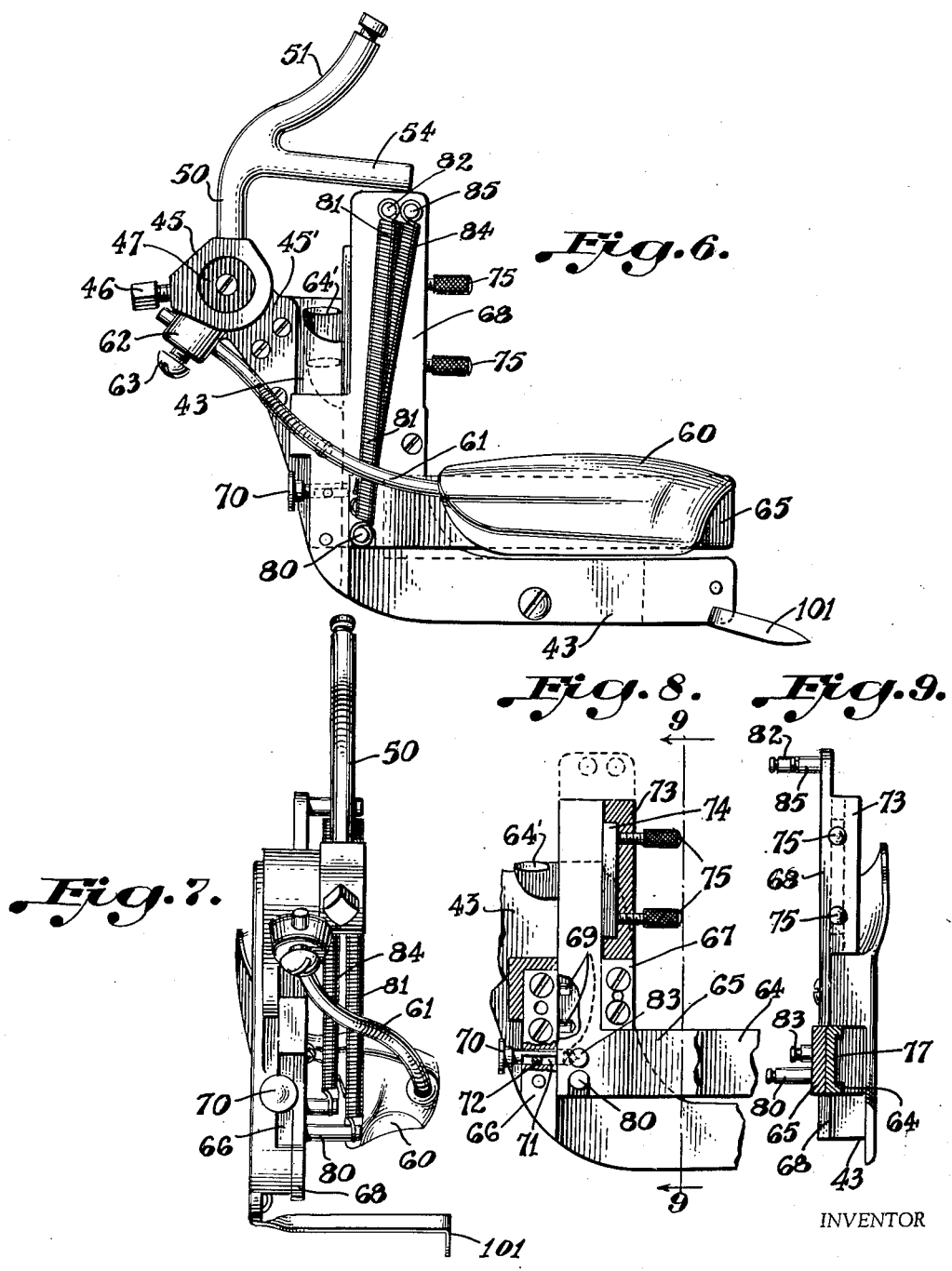

Patented Nov. 27, 1951

2,576,569

UNITED STATES PATENT OFFICE 2,576,569

DENTAL DEMONSTRATING APPARATUS

George Henry Burtenshaw, Auckland,
Auckland, New Zealand

Application October 19, 1949, Serial No. 122,189
In New Zealand June 30, 1949

14 Claims. (Cl. 32—71)

This invention relates to an improved denture demonstrating device for giving visual demonstrations of the various relationships assumed by dentures in a person's mouth and as affected by the varying conditions in the formation or shrinkages of the gums of the person over periods of time.

The present invention is an improvement over the devices disclosed in my prior Patents No. 2,103,058 of December 21, 1937, and No. 2,203,891 of June 11, 1940.

An object of this invention is to provide an improved denture demonstrating device of simplified and less costly construction and capable of clearly and fully demonstrating the effects of changes in the gum structure of a person's mouth on the relationship of their artificial dentures, facial expressions and general appearance.

Another object of this invention is to provide a device for visually demonstrating a number of effects associated with the removal of natural teeth and the use of artificial dentures, embodying a skull having an upper jaw simulating member equipped with retractable means for carrying separable partial upper dentures, a lower jaw simulating member equipped with retractible means for carrying partial lower dentures, mechanisms for effecting retraction of said dentures, means for pivoting the lower jaw simulating member relative to the upper jaw simulating member, a plurality of facial masks, and means for supporting the masks in positions over the jaw simulating members and dentures.

A further object of this invention is to provide a denture demonstrating device embodying means representing one side only of a skull, jaw members and dentures retractably associated therewith, facial masks and means for replaceably positioning the masks in register with the skull and jaw members.

With these and other objects in view, the present invention resides in the parts and combinations shown in the drawings and hereinafter described.

In order to facilitate an understanding of the invention, reference is made to the accompanying drawings in which:

Fig. 1 is a front elevational view of the demonstrating device with the facial masks removed;

Fig. 6 is a fragmentary rear elevational view of the lower jaw simulating member;

Fig. 7 is a side view of the member shown in Fig. 6;

Fig. 8 is a fragmentary view, partly in section, of the member shown in Fig. 6;

Fig. 9 is a sectional view taken on line 9—9 of Fig. 8;

Fig. 10 is a front elevational view of the demonstrating device with the masks supported on their carriers for swinging movement into and out of position over the skull.

Figure 2:
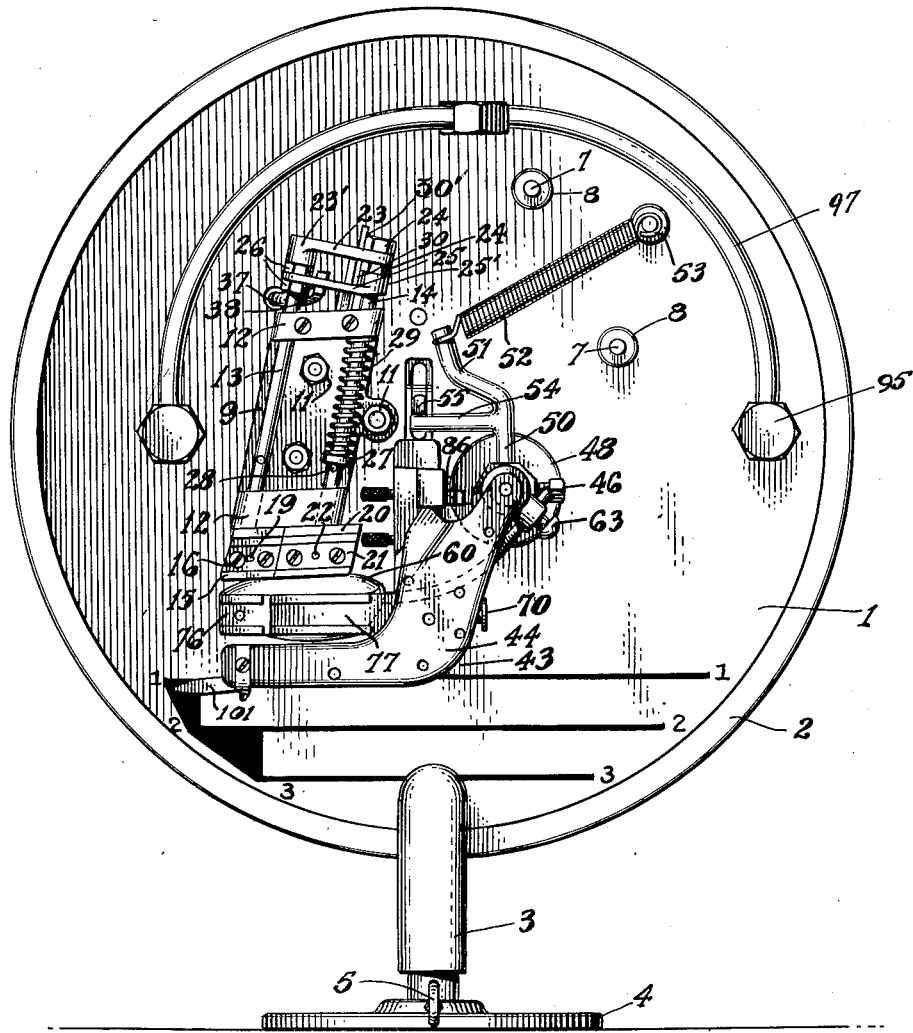
Fig. 2 is a view similar to Fig. 1 with the skull removed.
Figure 3:
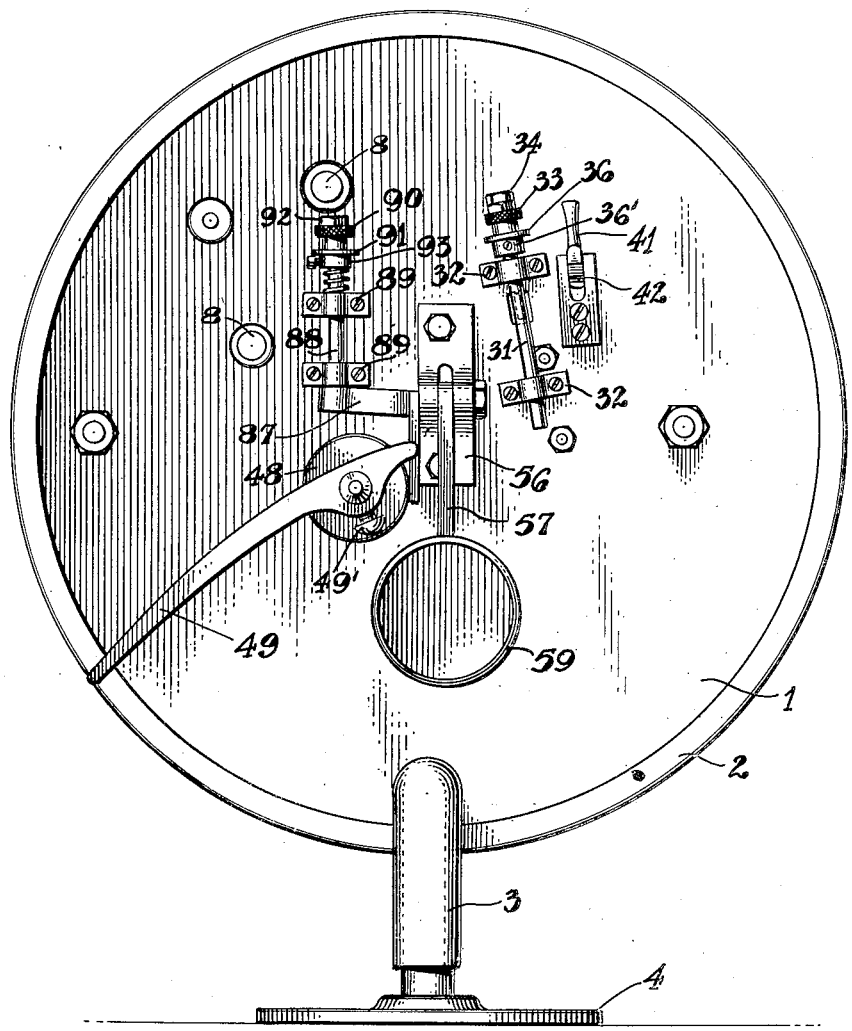
Fig. 3 is a rear elevational view of the device shown in Fig. 1.

As illustrated in the drawings, the demonstrating device of the present invention embodies a background plate 1 having a peripheral reinforcing rim 2. Background plate 1 is fixed to a pillar or standard 3 adapted to be detachably mounted in a base 4. Standard 3 is adapted to be vertically positioned in a socket in the base and may be positioned for rotation about its axis or fixed by a set screw 5.

A skull simulating member 6 in the form of metal plate covered with plastic material contoured on its frontal surface in the form of the upper portion of a skull is detachably carried by background plate 1. For this purpose, the rear portion of the skull simulating member 6 is provided with sockets (not shown) which receive pins 7 projecting forwardly from bosses 8 carried on the frontal surface of the plate 1. Of course, any equivalent attaching means may be employed.

A bracket 9 is rigidly secured to three vertically spaced and offset bosses 10 on the front of plate 1 by nuts 11 which are threaded onto studs carried by the bosses 10. Bracket 9 carries two vertically spaced substantially horizontally extending lugs 12. It will be noted that the lugs 12 are not truly vertically positioned one above the other but are slightly offset. Each of the lugs is provided with two bores near the ends thereof with the bores in the upper lug aligned with those in the lower lug. Axially slidably mounted in the aligned bores are two rods 13 and 14 which are inclined relative to the standard 3 and the vertical.

Figures 4, 5:
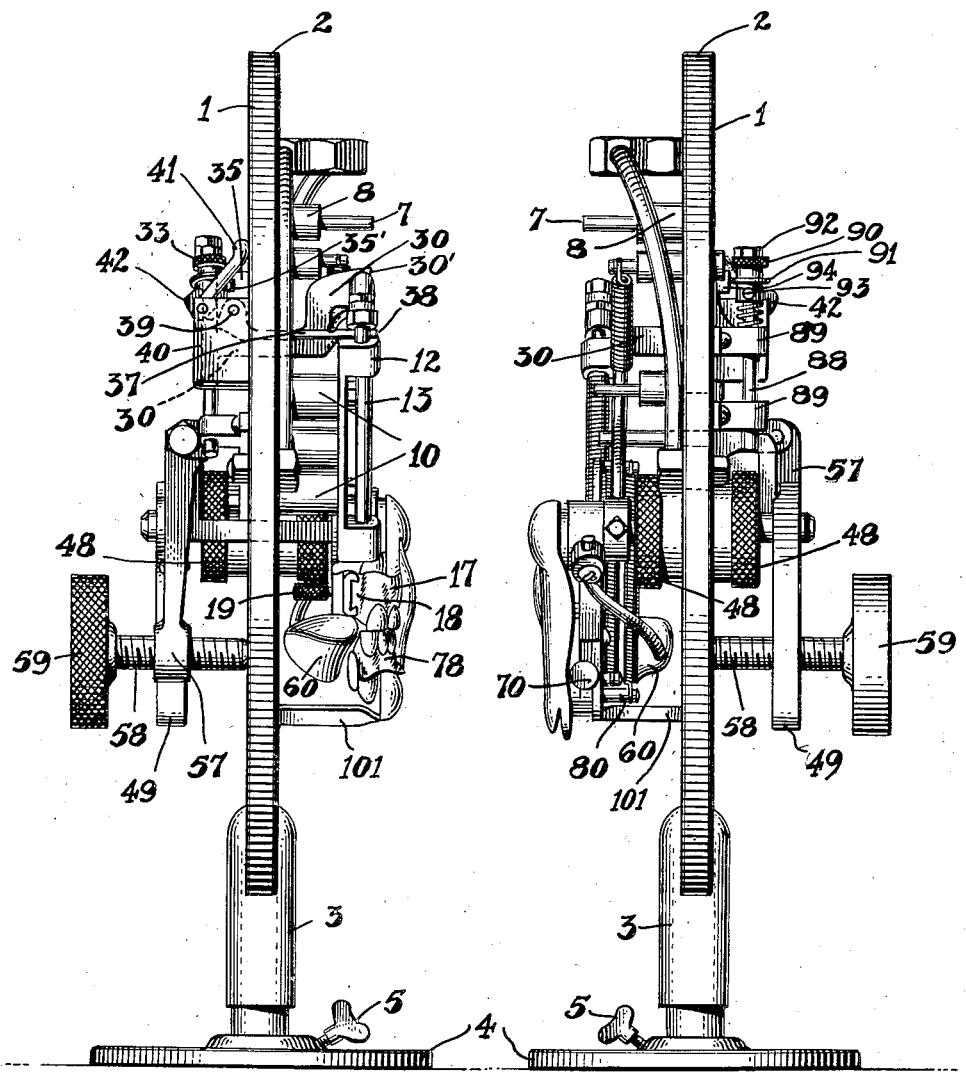
Fig. 4 is a side view taken from one side of the device of Fig. 1.
Fig. 5 is another side view taken from the opposite side of the device shown in Fig. 1.
Figure 11:
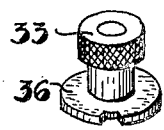
Fig. 11 is a perspective view of a knob for shifting a partial denture to simulate gum shrinkage.

On the lower end of rod 13 is carried a denture support 15 having a horizontally extending recess 16 of dovetail cross section as clearly shown in Figs. 2 and 4. A forward partial denture 17 having a securing member 18 fixed thereto of dovetail cross section is adapted to be received by the recess 16 and anchored in place by set screw 19.

A similar denture support 20 having a dovetail recess 21 and set screw 22 is carried by the lower end of rod 14 for receiving a rear partial denture 23O provided with a securing member similar to 18.

An arm 23 is secured on the upper end of rod 14 between nuts 24 threaded on rod 14. A similar arm 25 is secured on the upper portion of rod 13 between nuts 26 threaded on rod 13. Arm 23 has an opening in its free end 23' which freely receives rod 13 and arm 25 has an opening in its free end 25' which freely receives rod 14. These arms serve as means for shifting rods 13 and 14 and for preventing rotation thereof.

Rod 14 has a washer 27 thereon bearing against a pin 28 passing through the rod and a spring 29 surrounding rod 14 bears against the upper lug 12 and the washer to urge rod 14 downwardly.

Rod 14 may be shifted upwardly independently of rod 13 by means of an arm 30 extending through an opening in plate 1 and having a forked end 30' embracing the upper arm 23. Arm 30 is carried by and extends laterally from a rod 31 slidably mounted on the rear of the plate 1 in guide brackets 32. Rod 31 is shifted axially upwardly by means of a knurled knob 33 freely rotatably mounted on the upper end of rod 31 and retained thereon by a nut 34. The lower end of knob 33 carries a flange 36 of cam form which cooperates with the upper end of a lug 35 carried by the upper guide bracket 32 and plate 1. A collar 36' is fixed by a set screw to rod 31 and abuts the lower end of knob 33. Lug 35 is a thin vertically extending element and flange 36 has a slot in one point in its circumferential edge which receives lug 35 and thus permits rod 31 to move downwardly to its lowermost position.

Lug 35 is provided with a notch 35' to receive flange 36 to retain rod 31 in its lowermost position.

Both rods 13 and 14 may be shifted upwardly together by lever 37 extending through an opening in plate 1 having a forked end 38 embracing arm 25. Lever 37 is mounted on a fulcrum pin 39 carried by a support 40 mounted on the rear of plate 1. The lever 37 is rocked about its pivot by means of a small lever 41 also carried by support 40. Lever 41 has on its short arm 42 several flat surfaces engaging the short arm of lever 37 and serving to retain lever 41 in any of its several positions of adjustment to which it may be shifted.

It will be realized that by shifting rod 14 upwardly only the rear upper denture will be raised. On the other hand, by shifting both rods 13 and 14 upwardly, both the front and rear upper dentures will be raised.

A lower jaw simulating member is provided and embodies a metal frame 43 covered with a plastic surfacing element 44. The jaw frame 43 is fixed to a short arm 45' of a boss 45 provided with a set screw 46 for securing the boss and jaw on a shaft 47. Plate 1 is provided with aligned bosses 48 on each side through which shaft 47 extends and by means of which shaft 47 is journalled for rocking movement. An operating arm arm 49 is fixed to the rear end of shaft 47 by means of a suitable set screw 49'.

A bifurcated rod 50 extends upwardly from boss 45. The upper limb 51 is shaped to receive one end of a spring 52 having its other end anchored to a pin 53 carried by plate 1. This spring urges the jaw member to closed position. The other limb 54 of the rod is positioned for engagement by one arm 55 of a bell crank lever pivoted to a support 56 on the rear of plate 1. The other arm 57 of this bellcrank lever has a threaded opening through which extends a screw 58 provided with a knurled knob 59. The end of screw 58 engages the rear of plate 1. Upon rotating screw 58 to shift arm 57 away from the rear of plate 1, the arm 55 engaging limb 54 causes limb 54 to move downwardly which shifts the jaw to a more open position against the action of spring 52.

A tongue simulating member 60 is supported on a curved rod 61 which is secured in position in a bore of a support 62 carried by boss 45 by means of a set screw 63.

The metal plate 43 of the jaw simulating element is L-shaped and has two L-shaped denture carriers 64 and 65 mounted thereon. These L-shaped denture carriers are mounted with their vertical legs between two guide blocks 66 and 67 secured on the vertical leg of the jaw plate 43. It will be noted that the rear lower denture carrier 64 has both its vertical and horizontal legs shorter than the corresponding legs of the front lower denture carrier 65. The upper leg of carrier 64 slides between plate 43 and the upper leg of carrier 65, and the upper leg of carrier 65 is positioned for sliding movement between the upper leg of carrier 64 and a cover plate 68. At the end of the upper leg of carrier 64 is an offset ear 64' for shifting said carrier.

It will be noted that the engaging surfaces of the upper legs of carriers have cooperating recesses formed therein to provide between them cylindrical sockets 69 to receive a sliding pin 70 carried by guide block 66. Pin 70 has a slot 71 intermediate its ends in which a stop 72 is positioned to limit axial movement of pin 70 into and out of the sockets. This pin and socket construction enables the carriers to be locked in any one of three vertical positions.

Cover plate 68 carries a guide block 73 which as shown in Fig. 8 cooperates and forms an upper continuation of guide block 67. Block 73 has a recess receiving a brake shoe 74 which engages only the edge of the upper leg of carrier 65. Screws 75 are threadedly mounted in block 73 and engage shoe 74 to cause it to engage the edge of the upper leg of carrier 65 with varying degrees of friction.

Each of the horizontal legs of carriers 64 and 65 is offset so as to lie in planes parallel to but spaced from the planes containing the upper legs. Dovetail grooves 76 and 77 are formed on the front faces of the horizontal legs of carriers 65 and 64 adjacent the free ends thereof to receive corresponding mounting block of front and rear partial dentures 78 and 79.

Carrier 64 is provided with a pin 80 on which is mounted one end of a coil spring 81. The other end of spring 81 is anchored on a pin 82 carried by cover plate 68.

A similar pin 83 is mounted on carrier 65 to receive one end of a spring 84, the other end of which is anchored on a pin 85 on the cover plate 68. Springs 81 and 84 urge the carrier 64 and 65 upwardly. It will be noted that pin 80 of carrier 64 extends through an open notch in the bottom of the horizontal leg of carrier 65 which permits downward movement of carrier 64 independently of carrier 65. When carrier 65 is moved downwardly, however, pin 80 is engaged and causes carrier 64 to be simultaneously moved downwardly therewith.

Carrier 64 is shifted downwardly by means of a finger 86 engaging ear 64'. Finger 86 is carried by an L-shaped element 87 and extends through an opening in plate 1. The L-shaped element 87 is fixed on the lower end of a rod 88 slidably mounted in brackets 89 on the rear of plate 1. A knurled knob 90 having a cam shaped flange 91 is loosely mounted on the upper end of rod 88 between nut 92 and collar 93. Flange 91 has a slot in its periphery as does flange 36 and cooperates with an elongated thin vertical stop 94 carried by upper bracket 89. In this instance, however, cam flange 91 cooperates with the bottom edge of stop 94 and when rotated on rod 88 causes the rod 88 and connected parts 87, 86, 64', 64 and 79 to be lowered.

The structure described herein is to be used in conjunction with masks representing normal and disfigured profiles. For this purpose, plate 1 carries two supports 94 and 95 in which are swingably mounted two arms 96 and 97. Arm 96 carries a disfigured mask 98 and arm 97 carries a normal mask 99. These arms are of such length and so mounted that when swung over the center of plate 1, the mask carried thereby will cover and coincide with the skull 6 and associated parts.

A muscle representing element 100 of yieldable material such as rubber, having hooked ends, one of which is received in a socket in the skull and the other of which is received in a socket beneath the jaw as shown in Fig. 10 is provided to show the effect of absorption or shrinkage of the gums on the jaw muscles.

For comparing the position of the lower jaw member, a pointer 101 is mounted thereon for cooperation with suitable indicia appearing on the face of plate 1.

The appliance or device of the present invention, in its form and use, is adapted to give a visual profile demonstration of the dentures in position in the jaws of the wearer and in relation to a profile representation or mask of the wearer's face and to provide for the dentures being changed in their relationship to represent the changes caused by shrinkages taking place in the wearer's gums.

The said appliance has been developed for use more particularly by dentists in demonstrating to patients the changes in facial appearance and expression and the functioning of the jaws that take place brought about by the conditions of their gums and the fitting of their dentures. It also may be used to demonstrate a number of effects that are connected with the use of dentures, as for instance, loss of masticatory efficiency, loss of crushing power, loss of ability to open the mouth wide enough for speech and food. In addition, it may be used to denote the effect of physical changes such as straightening of the angle of the jaw, damage to the joint and tongue interference. It may be used by lecturers and others in demonstrating these changes and effects to students or others.

From the foregoing, it will be realized that the present invention provides an appliance for fully demonstrating the effects of absorption or shrinkage of the gums on full or partial upper or lower or upper and lower dentures; and the effects on the expression of the wearer.

The appliance described may be duplicated by an exact replica thereof fixed upon the reverse side of the carrying frame background in corresponding position therewith. The two appliances are then combined to have their lower jaw actuating mechanism controlled by the same means in order that the jaws will move in correspondence one with the other, but to provide for the upward and downward movements of the dentures in the respective jaws capable of independent adjustment. Thus, the respective appliances may be set to show, by one of them, a correct positioning of the dentures and facial alignment thereof, and by the other, the effects brought about by gum shrinkages. A demonstrator therefore by swinging the background frame around in its rotative vertical mounting may demonstrate to an observer the contrast between the facial and other appearances between the two.

Having now described my invention, what I claim is:

1. An apparatus for demonstrating effects on profiled facial expression of shrinkage of human gums fitted with artificial dentures comprising a support in the form of a plane element, profiled upper denture simulating means of general flat construction carried by said support for movement in a generally vertical direction for simulating upper gum shrinkage effects, a lower jaw simulating member of generally flat construction pivoted to said support for swinging movement, and profiled lower denture simulating means of general flat construction carried by the lower jaw member for movement in a generally vertical direction for simulating lower gum shrinkage effects.

2. An apparatus for demonstrating effects on profiled facial expression of shrinkage of human gums fitted with artificial dentures comprising a support in the form of a plane element, profiled upper denture means carried by said support for movement in a generally vertical direction for simulating upper gum shrinkage effects, a lower jaw simulating member of generally flat construction pivoted to said support for swinging movement, and profiled lower denture means carried by the lower jaw member for movement in a generally vertical direction for simulating lower gum shrinkage effects, said upper and lower denture means being formed of front and rear sections with the rear sections movable independently of the front sections.

3. An apparatus for demonstrating effects on profiled facial expression of shrinkage of human gums fitted with artificial dentures comprising a support in the form of a plane element profiled upper denture simulating means of general flat construction carried by said support for movement in a generally vertical direction for simulating upper gum shrinkage effects, a lower jaw simulating member of generally flat construction pivoted to said support for swinging movement, profiled lower denture simulating means of general flat construction carried by the lower jaw member for movement in a generally vertical direction for simulating lower gum shrinkage effects, facial profile mask means of general flat construction, and means for positioning said mask means in register with the denture means.

4. An apparatus for demonstrating effects on profiled facial expression of shrinkage of human gums fitted with artificial dentures comprising a support in the form of a plane element, profiled upper denture means carried by said support for movement in a generally vertical direction for simulating upper gum shrinkage effects, a lower jaw simulating member of generally flat construction pivoted to said support for swinging movement, profiled lower denture means carried by the lower jaw member for movement in a generally vertical direction for simulating lower gum shrinkage effects, said upper and lower denture means being formed of front and rear sections with the rear sections movable independently of the front sections, facial mask means, and means for positioning said mask means in register with the denture means.

5. An apparatus for demonstrating effects on profiled facial expression of shrinkage of human gums fitted with artificial dentures comprising a support in the form of a plane element, profiled upper denture simulating means of general flat construction, guide means carried by the support for mounting the denture means for sliding movement in a generally vertical direction for simulating upper gum shrinkage effects, a lower jaw simulating member of generally flat construction pivotally mounted on said support for swinging movement, profiled lower denture simulating means of general flat construction, carrier mechanism for said lower denture means, and guide means carried by said lower jaw member for supporting the lower denture carrier mechanism for movement in a generally vertical direction for simulating lower gum shrinkage effects.

6. An apparatus for demonstrating effects on profiled facial expression of shrinkage of human gums fitted with artificial dentures comprising a support in the form of a plane element, profiled upper denture simulating means of general flat construction carried by said support for movement in a generally vertical direction for simulating upper gum shrinkage effects, a lower jaw simulating member of generally flat construction pivoted to said support for swinging movement, profiled lower denture simulating means of general flat construction carried by the lower jaw member for movement in a generally vertical direction for simulating lower gum shrinkage effects, means resiliently urging the upper denture means downwardly, and means resiliently urging the lower denture means upwardly.

7. An apparatus for demonstrating effects on profiled facial expression of shrinkage of human gums fitted with artificial dentures comprising a support in the form of a plane element, profiled upper denture simulating means of general flat construction carried by said support for movement in a generally vertical direction for simulating upper gum shrinkage effects, a lower jaw simulating member of generally flat construction pivoted to said support for swinging movement, profiled lower denture simulating means of general flat construction carried by the lower jaw member for movement in a generally vertical direction for simulating lower gum shrinkage effects, means resiliently urging the upper denture means downwardly, means resiliently urging the lower denture means upwardly, means for adjustably limiting the downward movement of the upper denture means, and means for adjustably limiting the upper movement of the lower denture means.

8. An apparatus for demonstrating effects on profiled facial expression of shrinkage of human gums fitted with artificial dentures comprising a support in the form of a plane element, profiled upper denture means carried by said support for movement in a generally vertical direction for simulating upper gum shrinkage effects, a lower jaw simulating member of generally flat construction pivoted to said support for swinging movement, profiled lower denture means carried by the lower jaw member for movement in a generally vertical direction for simulating lower gum shrinkage effects, means resiliently urging the upper denture means downwardly, means resiliently urging the lower denture means upwardly, means for adjustably limiting the downward movement of the upper denture means, means for adjustably limiting the upper movement of the lower denture means, and means for locking the denture means against movement.

9. An apparatus for demonstrating effects on profiled facial expression of shrinkage of human gums fitted with artificial dentures comprising a support in the form of a plane element, profiled upper denture means including front and rear sections, guide means carried by the support for independently mounting the upper denture sections for sliding movement in a generally vertical direction for simulating upper gum shrinkage effects, a lower jaw simulating member of generally flat construction pivotally mounted on said support for swinging movement, profiled lower denture means including front and rear sections, separate carrier mechanisms for each lower denture section and guide means carried by said lower jaw member for supporting the lower denture carrier mechanisms for independent movement in a generally vertical direction for simulating lower gum shrinkage effects.

10. An apparatus for demonstrating effects on profiled facial expression of shrinkage of human gums fitted with artificial dentures comprising a support in the form of a plane element, profiled upper denture means including front and rear sections, guide means carried by the support for independently mounting the upper denture sections for sliding movement in a generally vertical direction for simulating upper gum shrinkage effects, a lower jaw simulating member of generally flat construction pivotally mounted on said support for swinging movement, profiled lower denture means including front and rear sections, separate carrier mechanisms for each lower denture section and guide means carried by said lower jaw member for supporting the lower denture carrier mechanisms for independent movement in a generally vertical direction for simulating lower gum shrinkage effects, and resilient means urging the upper denture sections downwardly and urging the lower denture sections upwardly.

11. An apparatus for demonstrating effects on profiled facial expression of shrinkage of human gums fitted with artificial dentures comprising a support in the form of a plane element, profiled upper denture means including front and rear sections, guide means carried by the support for independently mounting the upper denture sections for sliding movement in a generally vertical direction for simulating upper gum shrinkage effects, a lower jaw simulating member of generally flat construction pivotally mounted on said support for swinging movement, profiled lower denture means including front and rear sections, separate carrier mechanisms for each lower denture section and guide means carried by said lower jaw member for supporting the lower denture carrier mechanisms for independent movement in a generally vertical direction for simulating lower gum shrinkage effects, resilient means urging the upper denture sections downwardly and urging the lower denture sections upwardly, and means for retractably shifting the rear denture sections independently of the front sections.

12. An apparatus for demonstrating effects on profiled facial expression of shrinkage of human gums fitted with artificial dentures comprising a support in the form of a plane element, profiled upper denture means including front and rear sections, guide means carried by the support for independently mounting the upper denture sections for sliding movement in a generally vertical direction for simulating upper gum shrinkage effects, a lower jaw simulating member of generally flat construction pivotally mounted on said support for swinging movement, profiled lower denture means including front and rear sections, separate carrier mechanisms for each lower denture section and guide means carried by said lower jaw member for supporting the lower denture carrier mechanisms for independent movement in a generally vertical direction for simulating lower gum shrinkage effects, resilient means urging the upper denture sections downwardly and urging the lower denture sections upwardly, means for retractably shifting the rear denture sections independently of the front sections, and means for locking the rear denture sections in retracted positions.

13. An apparatus for demonstrating effects on profiled facial expression of shrinkage of human gums fitted with artificial dentures comprising a support in the form of a plane element, profiled upper denture means including front and rear sections, guide means carried by the support for independently mounting the upper denture sections for sliding movement in a generally vertical direction for simulating upper gum shrinkage effects, a lower jaw simulating member of generally flat construction pivotally mounted on said support for swinging movement, profiled lower denture means including front and rear sections, separate carrier mechanisms for each lower denture section and guide means carried by said lower jaw member for supporting the lower denture carrier mechanisms for independent movement in a generally vertical direction for simulating lower gum shrinkage effects, means resiliently urging the lower jaw member to a closed position, and means for adjustably limiting the position to which the jaw is moved by the resilient means.

14. An apparatus for demonstrating effects on profiled facial expression of shrinkage of human gums fitted with artificial dentures comprising a support in the form of a plane element, profiled upper denture simulating means of general flat construction carried by said support for movement in a generally vertical direction for simulating upper gum shrinkage effects, a lower jaw simulating member of generally flat construction pivoted to said support for swinging movement, profiled lower denture simulating means of general flat construction carried by the lower jaw member for movement in a generally vertical direction for simulating lower gum shrinkage effects, facial profile masks of general flat construction, arms swingably mounted on said support, and means on the free ends of said arms for carrying said masks, and shifting said masks selectively into and out of register with the denture means.

GEORGE HENRY BURTENSHAW.

REFERENCES CITED

The following references are of record in the file of this patent:

UNITED STATES PATENTS

| Number | Name | Date |
| --- | --- | --- |
| 2,178,717 | Burtenshaw | Nov. 7, 1939 |
| 2,203,891 | Burtenshaw | June 11, 1940 |

FOREIGN PATENTS

| Number | Country | Date |
| --- | --- | --- |
| 794,444 | France | Dec. 12, 1935 |